Patented Feb. 26, 1935

1,992,598

UNITED STATES PATENT OFFICE 1,992,598

PRODUCTION OF ACETYLENE

Paul Baumann and Heinrich Schilling, Ludwigshafen-on-the-Rhine, and Robert Stadler, Ziegelhausen, Germany, assignors to I. G. Farbenindustrie Aktiengesellschaft, Frankfort-on-the-Main, Germany No Drawing. Application February 13, 1933, Serial No. 656,582. In Germany February 13, 1932

3 Claims. (Cl. 204—31)

The present invention relates to the production of acetylene from gases containing hydrocarbons by treatment in the electric arc.

In the treatment of methane or gas mixtures containing methane in the electric arc, up to about 17 per cent of acetylene may be obtained in the final gas in one operation while avoiding as far as possible the formation of carbon black when starting from a gas containing a sufficient concentration of methane i. e. at least 50 per cent. When working to obtain a higher content of acetylene, more carbon black is formed. In the working up of 90 per cent methane, having regard to a small formation of carbon black, up to 55 per cent of the carbon in the methane may be converted into acetylene in one operation. The conversion is considerably less with reference to the content of carbon in the gases when hydrocarbons of higher molecular weight, such as ethane, propane or butane, are worked up, because it has been found that even in this case no greater content of acetylene in the final gas than that above stated can be obtained if it is desired to work with practically no formation of carbon black. If it is desired to convert the carbon present in the gas mixture to be employed as far as possible into acetylene, the gas mixture, as has already been proposed, may be passed consecutively through several electric arcs the length of which is different and so adapted to the changing composition of the gas mixture that in each case an optimum conversion of carbon into acetylene takes place (as described for example, in the Patent No. 1,794,004) whereby the acetylene formed is removed from the gas mixture before its passage through each arc. The expenditure of energy for the formation of acetylene (measured in kilowatt-hours per cubic meter of acetylene) increases greatly, however, from stage to stage by reason of the rapidly decreasing carbon content of the gas mixture to be worked up.

We have now found that more favorable results are obtained by treating gases comprising dispersed combustible carbonaceous substances in combination with free or chemically combined hydrogen, by which term we mean gaseous or vaporous hydrocarbons or finely dispersed liquid hydrocarbons or dispersed solid substances comprising carbonaceous matter such as dust of coal or coke suspended in hydrogen, preferably hydrocarbon gases containing more than 30 or 35 per cent by weight of carbon, consecutively in several electric arcs while selecting for each arc a supply of energy per cubic meter of gas passed therethrough which is greater than that employed in the preceding arc in such a manner that the concentration in the gas of the acetylene formed in each of the consecutive arcs successively increases. In order to fulfil this latter condition it is necessary to effect a relatively small conversion in the first stage or stages so that sufficient hydrocarbons not converted into acetylene are still present in the gas to be further treated. The amount of energy supplied per cubic meter of gas may be increased either by supplying more kilowatts to successive electric arcs while employing the same amount of gas or by reducing the speed of flow of the gas while keeping the supply of energy constant. It is also possible to employ both methods. For example the process may be carried out in such a manner that only about half of the amount of acetylene obtainable without considerable formation of carbon black is obtained in the first electric arc treatment, then, after removal of the acetylene, a somewhat greater concentration is obtained in the second electric arc treatment and so on, the greatest possible conversion not being aimed at until the last electric arc treatment. Observations have shown that the expenditure of energy per cubic meter of acetylene formed in the electric arc increases not simply in proportion to the decrease in the concentration of the hydrocarbons in the initial gas, but much more rapidly with small contents of hydrocarbons than with larger contents of hydrocarbons. This difference in the increase in the expenditure of energy with falling concentration is the more pronounced the higher the molecular weight of the saturated or unsaturated hydrocarbons to be worked up.

The process according to the present invention offers the following advantages, inter alia:—

In the consecutive electric arc treatments, in particular those preceding the last, more hydrocarbons not converted into acetylene are contained in the treated gas than would be contained therein when aiming at the optimum obtainable conversion (i. e. without formation of carbon black) in each electric arc treatment. Since the expenditure of energy for the formation of acetylene is less the higher the concentration of the hydrocarbons, the total average expenditure of energy per cubic meter of acetylene necessary according to the present invention is considerably less than that which would have to be employed when working with an optimum conversion in each electric arc according to the processes hitherto known.

According to this invention it is possible to increase considerably the total amount of carbon converted into acetylene at practically the same average expenditure of energy per cubic meter of acetylene.

When working up gases very rich in carbon, the danger of the formation of carbon black is especially great. While, for example, when working up concentrated (95 per cent) methane into 17 per cent acetylene in one stage, carbon black is obtained in an amount corresponding to only about 1.5 per cent by weight of the carbon of the acetylene formed, when preparing 17 per cent acetylene from a mixture of ethane and propane under the same conditions, from 4 to 5 per cent of the acetylene is obtained as carbon black. The carbon obtained in the form of carbon black is lost, however, as far as the formation of acetylene is concerned. By working according to this invention, the loss by reason of the formation of carbon black is greatly reduced because the formation of carbon black decreases with decreasing concentration of acetylene. For example in the preparation of only from 8 to 9 per cent acetylene from the said mixture of ethane and propane, the carbon black formed amounts only to 1.5 per cent by weight of the acetylene formed. Thus it is possible according to this invention to prevent to a large extent the loss of carbon by the formation of carbon black in the working up of gases very rich in carbon into acetylene. The same is true of the losses by reason of the formation of other undesirable by-products of electric arc acetylene, such as diacetylene or allylene.

The process according to this invention may be employed with special advantage when it is desired to work up waste gases which are very rich in carbon, as for example waste gases from hydrogenation or cracking plant. It may also be used with advantage for working up natural gas, especially when it is desired to produce a final gas which only contains a small amount of hydrocarbon and at the same time to keep the average expenditure of energy per cubic meter of acetylene at the lowest possible value.

The different electric arcs arranged one behind another may be worked at any desired pressures. In many cases it is advantageous, especially when treating gases very rich in carbon, to work the first electric arcs at reduced pressure, and the latter electric arcs, in which gases less rich in carbon are being worked up, at higher pressures.

In carrying out the process according to this invention it is not necessary specially to adapt the single electric arc chambers to the changing composition of the gases. It is therefore possible to operate all the different electric arcs with one and the same voltage in which case the speed of flow of the gas is successively reduced; this is attended by a great simplification of the electric plant because, for example, several electric arcs may be operated from a common rectifier.

The process may be used for example with from 2 to 6 electric arcs, preferably with 3 or 4 electric arcs.

The following example will further illustrate the nature of this invention but the invention is not restricted to this example.

Example 1000 cubic meters of a gas having the composition: 1 per cent of hydrogen, 1 per cent of nitrogen, 6 per cent of methane, 26.5 per cent of ethane, 44.5 per cent of propane and 21 per cent of butane, are led consecutively through three electric arcs. The acetylene formed in each arc is converted into acetaldehyde catalytically at 300° C. and then washed out with water. In the first electric arc, which is operated with 4000 volts and 275 amperes, 140 cubic meters of acetylene are formed in the form of a 10 per cent gas mixture. In the second electric arc, which is operated with 6600 volts and 275 amperes and through which about 1250 cubic meters of the residual gas from the prior arc are passed, 215 cubic meters of acetylene are produced in the form of a 12 per cent gas mixture and in the third electric arc, which is operated with 6600 volts and 605 amperes and through which are passed about 1575 cubic meters of residual gas from the second arc, 420 cubic meters of acetylene are produced in the form of a 17 per cent gas mixture. The expenditure of energy in the first electric arc is 7.85 kilowatt-hours per cubic meter of acetylene, in the second electric arc 8.45 kilowatt-hours per cubic meter of acetylene and in the third electric arc 9.3 kilowatt-hours per cubic meter of acetylene. Thus the total yield of acetylene is 770 cubic meters with an average expenditure of energy of 8.9 kilowatt-hours per cubic meter of acetylene. The residual gas (about 2000 cubic meters), after converting the acetylene and removing the acetaldehyde formed, still contains 5 per cent of unsaturated hydrocarbons and 20 per cent of paraffinic hydrocarbons; thus 59 per cent of the carbon originally present has been converted into acetylene. The formation of carbon black amounts, on an average, only to 1 per cent of the acetylene formed. Further treatment of this gas in the electric arc is no longer worth while by reason of the small content of hydrocarbons and the consequent great expenditure of energy necessary for the production of acetylene.

Instead of the third electric arc, two parallel electric arcs may be employed each being operated with 6600 volts and 302 amperes. In this case the expenditure of energy and the yield of acetylene in the third stage are practically the same.

What we claim is:—

1. A process for the production of acetylene from a gas comprising a dispersed combustible carbonaceous substance in combination with hydrogen which comprises treating the gas consecutively in a plurality of electric arcs, operating the first arc under conditions suitable for the production of only part of the possible maximum yield of acetylene, separating the acetylene formed, passing all the residual gas through at least one succeeding arc, while operating each successive arc so that the supply of energy per cubic centimeter of gas treated therein is greater than that in the next preceding arc and so that the concentration of acetylene in the gas formed in each arc is greater than that of the gas formed in the next preceding arc, and separating the acetylene formed from the gas in each arc prior to the introduction of the gas into the next succeeding arc.

2. A process according to the preceding claim in which the initial material is a gas comprising a volatilized hydrocarbon.

3. The process according to claim 1 in which the initial material is a gas comprising a gaseous hydrocarbon of the methane series.

PAUL BAUMANN.
HEINRICH SCHILLING.
ROBERT STADLER.